J. L. HINDS.
COUPLING FOR ELECTRIC CONDUCTORS.
APPLICATION FILED APR. 1, 1909.

939,501.

Patented Nov. 9, 1909.

WITNESSES:
Chas. H. Young.
H. Kaufman.

INVENTOR
Jesse L. Hinds
BY
Parsons, Hall & Bodell
ATTORNEYS

United States Patent Office.

JESSE L. HINDS, OF SYRACUSE, NEW YORK, ASSIGNOR TO CROUSE-HINDS COMPANY, OF SYRACUSE, NEW YORK, A CORPORATION OF NEW YORK.

COUPLING FOR ELECTRIC CONDUCTORS.

939,501.

Specification of Letters Patent. Patented Nov. 9, 1909.

Application filed April 1, 1909. Serial No. 487,126.

*To all whom it may concern:*

Be it known that I, JESSE L. HINDS, of Syracuse, in the county of Onondaga and State of New York, have invented a certain new and useful Coupling for Electric Conductors, of which the following is a specification.

My invention has for its object the production of a particularly simple and effient coupling for electric conductors, and it consists in the combinations and constructions hereinafter set forth and claimed.

In describing this invention, reference is had to the accompanying drawing in which like characters designate corresponding parts in all the views.

Figure 1:
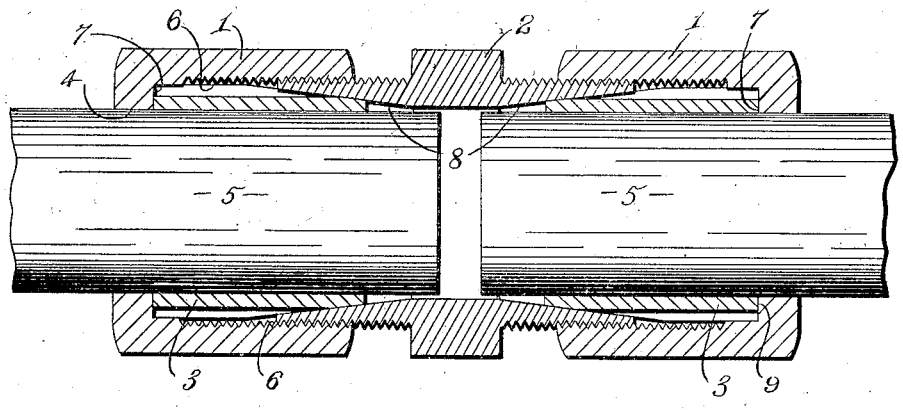
Figure 2:
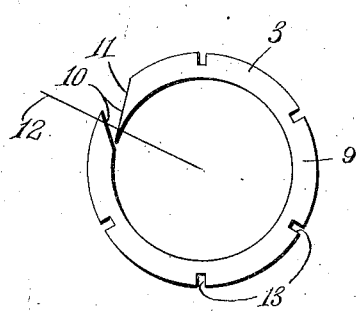
Figure 3:
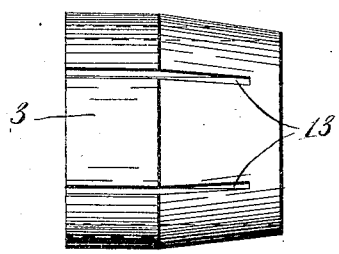

Figure 1 is a longitudinal section of one form of my coupling, contiguous ends of conductors or cables connected thereby being also shown. Figs. 2 and 3 are, respectively, end and side elevations of one of the sleeves.

This coupling comprises, generally, an outer section 1, an inner section 2, and a sleeve 3 in said sections. In the illustrated form of my invention, I have shown two outer sections 1 receiving opposite ends of the inner section, but it is obvious that one of said outer sections may be dispensed with, if desired.

The outer section 1 is formed with a passage 4 for the naked end of a conductor 5, a threaded passage 6 alined with the passage 4 and of greater diameter than the same, and an annular shoulder 7 arranged at the inner end of the threaded passage at a right angle to the axis of the section 1. The inner section 2 is externally threaded and turns into the threaded passage 6 of the outer section, and is formed with a conical bore 8, having its larger end arranged toward the shoulder 7 of the outer section. As illustrated, when the coupling is provided with two outer sections, one at each end, both ends of the inner section are threaded and provided with conical bores, but if one of the outer sections is dispensed with one end of the inner section may be otherwise formed.

One end of the sleeve 3 is provided with a shoulder or face 9 disposed at a right angle to the axis of the outer section and engaging the annular shoulder 7 of the outer section, and its other end is tapered and projects into the conical bore of the inner section. As seen in Fig. 2 the sleeve 3 is provided with a lengthwise peripheral slot 10 substantially V-shaped in cross-section and communicating at its narrowest part with the bore of the sleeve, and having one of its sides 11 substantially tangent to said bore. Opposing portions of the walls of the slot 10 project beyond opposite sides of a line 12 extending radially through said walls and are spaced unequal distances from the center of the sleeve. By forming the walls of the slot 10 as described, said slot is provided at one side with a relatively thin and flexible lengthwise edge or portion at the meeting surfaces of the bore of the sleeve and the side 11 of the slot. Preferably, the sleeve 3 is also provided with lengthwise peripheral grooves 13 spaced equal distances apart, two of said grooves being located on opposite sides of the slot 10 and at equal distances therefrom. If desired, the grooves 13 may be dispensed with, or otherwise arranged.

In operation, the naked end of a conductor or cable 5 is inserted through the outer section 1 into the sleeve 3, and as the sections 1 and 2 are drawn toward each other by turning either one or the other, the annular shoulder 7 of the outer section 1 engages the shoulder or face 9 of the sleeve 3, forcing said sleeve into the conical bore of the inner section 2 and thereby compressing the sleeve upon the conductor. In the compression of the sleeve 3, the inner thin and flexible edge or portion of the tangential wall 11 of the slot 10 engages the opposing inner edge of the slot 10 and enters the bore of the sleeve in a direction substantially tangential to such bore without materially altering the curvature of the bore or injuring the conductor within the sleeve, and thus adapts the sleeve for use on electric conductors of different diameter.

As will be obvious to those skilled in the art the construction and arrangement of the shoulder 9 and the tapered end of the sleeve 3 of the coacting parts of the sections 1 and 2 effect a particularly powerful compression of the sleeve, and a highly efficient electrical contact between the sleeve and the inner section without producing any strain tending to separate the engaging surfaces of the outer and inner sections of the coupling, as would be the case were the passage 4 conical and both ends of the sleeve tapered.

What I claim is:—

A coupling for electric conductors comprising a compressible sleeve and means for compressing the same, the sleeve having a smooth bore for receiving a conductor and making electrical contact therewith throughout substantially the extent of said bore, said sleeve having a lengthwise slot extending transversely therethrough, the opposing walls of the slot inclining in the same general direction, and one of such walls being disposed substantially tangential to the bore of the sleeve adjacent to the opposite wall of the slot, whereby the slot is provided at one side thereof at the meeting surfaces of said tangential wall of the slot and the bore of the sleeve with a relatively thin and flexible lengthwise edge which coacts with the opposing inner edge of the slot and enters the bore of the sleeve in a direction substantially tangential to such bore without materially altering the curvature of the sleeve or injuring the conductor within said sleeve, thus adapting the sleeve for use on electric conductors of different diameter, substantially as described.

In testimony whereof, I have hereunto signed my name in the presence of two attesting witnesses, at Syracuse, in the county of Onondaga, in the State of New York, this 29th day of March, 1909.

JESSE L. HINDS.

Witnesses:
S. DAVIS,
FREDERIC G. BODELL.